(12) United States Patent
Luo et al.

(10) Patent No.: US 8,023,227 B2
(45) Date of Patent: Sep. 20, 2011

(54) PERPENDICULAR RECORDING HEAD WITH A GROOVED YOKE

(75) Inventors: Peng Luo, Fremont, CA (US); Shuyu Sun, Saratoga, CA (US); Chaoyuan Chen, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 455 days.

(21) Appl. No.: 11/710,079

(22) Filed: Feb. 23, 2007

(65) Prior Publication Data

US 2008/0204930 A1    Aug. 28, 2008

(51) Int. Cl.
*G11B 5/127* (2006.01)

(52) U.S. Cl. ........................................ 360/126

(58) Field of Classification Search .................. None
See application file for complete search history.

(56) References Cited

U.S. PATENT DOCUMENTS

| | | | | |
|---|---|---|---|---|
| 4,700,252 A | * | 10/1987 | Muraoka et al. | 360/321 |
| 5,432,644 A | * | 7/1995 | Tajima et al. | 360/99.04 |
| 6,288,871 B1 | * | 9/2001 | Tanabe | 360/125.51 |
| 7,408,740 B2 | * | 8/2008 | Sasaki et al. | 360/125.11 |

FOREIGN PATENT DOCUMENTS

JP       61158017 A  *  7/1986

* cited by examiner

*Primary Examiner* — Mark Blouin

(57) ABSTRACT

Disclosed is a perpendicular recording head for a hard disk drive. The perpendicular recording head includes a yoke that has a plurality of grooves essentially perpendicular to a magnetic flux that flows in a vertical direction relative to the yoke. The perpendicular grooves inhibit residual magnetism in the vertical direction and enhance yoke domain stability.

9 Claims, 3 Drawing Sheets

PERPENDICULAR RECORDING HEAD WITH A GROOVED YOKE

BACKGROUND OF THE INVENTION

1. Field of the Invention

The present invention relates to perpendicular recording heads used in hard disk drives.

2. Background Information

Hard disk drives contain a plurality of magnetic heads that are coupled to rotating disks. The heads can magnetize and sense the magnetic fields of the disks to write and read data, respectively. The heads each have an air bearing surface that cooperates with a flow of air generated by the rotating disks to create an air bearing. The air bearing prevents mechanical wear between the head and the disk.

The heads magnetize the disk in either a horizontal direction parallel with the disk surface, of a vertical direction perpendicular to the surface of the disk. Vertical recording occupies less surface space and thus allows for increased disk capacity.

Vertical recording heads include a write pole that emanates a magnetic field. The poles typically extend from a yoke. The poles and yoke are integrally formed during the fabrication of the head.

As shown in FIG. 1, the generation of a write current will create a magnetic flux 1 that is vertically aligned with a yoke 2 of a head. When the write current is terminated there is a residual magnetism in the yoke. As shown in FIG. 2, because of the crystalline structure of the yoke 2, the residual magnetism 3 has components in the vertical direction. This vertical magnetism can cause yoke domain lock up. It is possible to reduce domain lock-up by forming an anti-ferromagnetic layer in the yoke. But this would require a sputtering process and would limit the type of manufacturing processes that can be used to fabricate the heads. It would be desirable to provide a yoke design that reduce domain lock-up and would allow the head to be fabricated with different manufacturing processes.

BRIEF SUMMARY OF THE INVENTION

A perpendicular recording head for hard disk drive. The head generates a flux that flows in a vertical direction and has a plurality of grooves essentially perpendicular to the flux.

DETAILED DESCRIPTION

Disclosed is a perpendicular recording head for a hard disk drive. The perpendicular recording head includes a yoke that has a plurality of grooves essentially perpendicular to a magnetic flux that flows in a vertical direction relative to the yoke. The perpendicular grooves inhibit residual magnetism in the vertical direction and enhance yoke domain stability.

Figure 1:
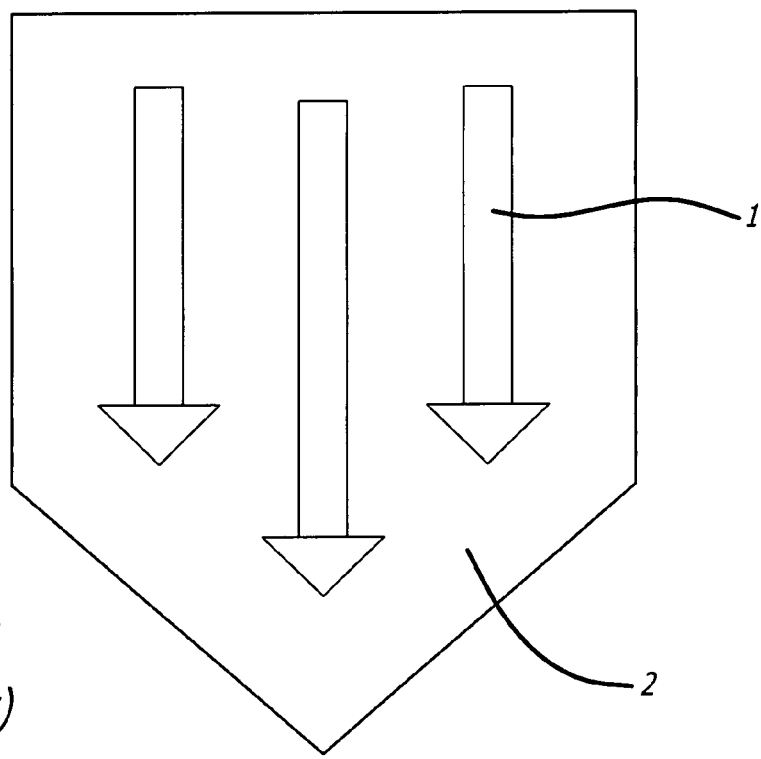
FIG. 1 is an illustration showing magnetic flux flowing relative to a yoke of a head of the prior art.
Figure 2:
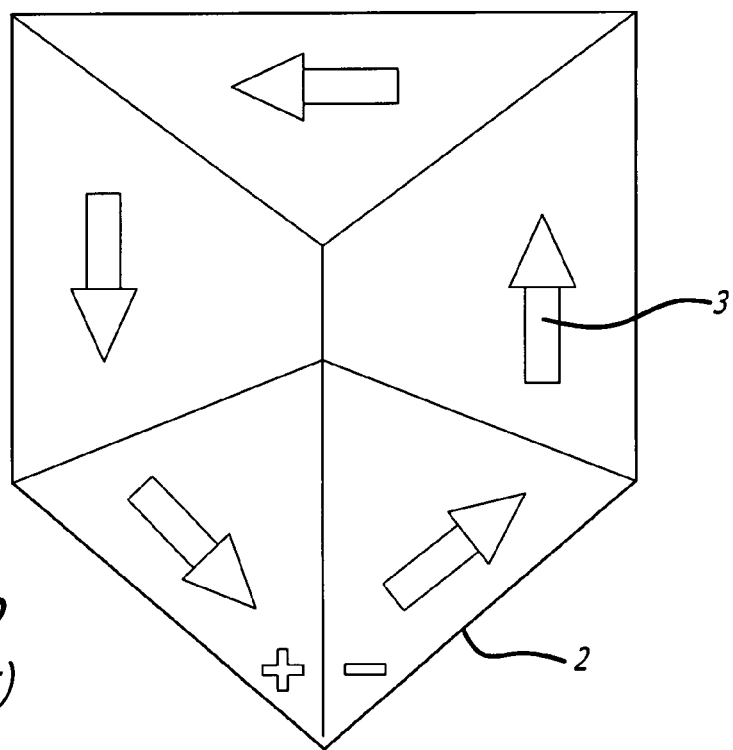
FIG. 2 is an illustration showing residual magnetism within the yoke of the prior art.
Figure 3:
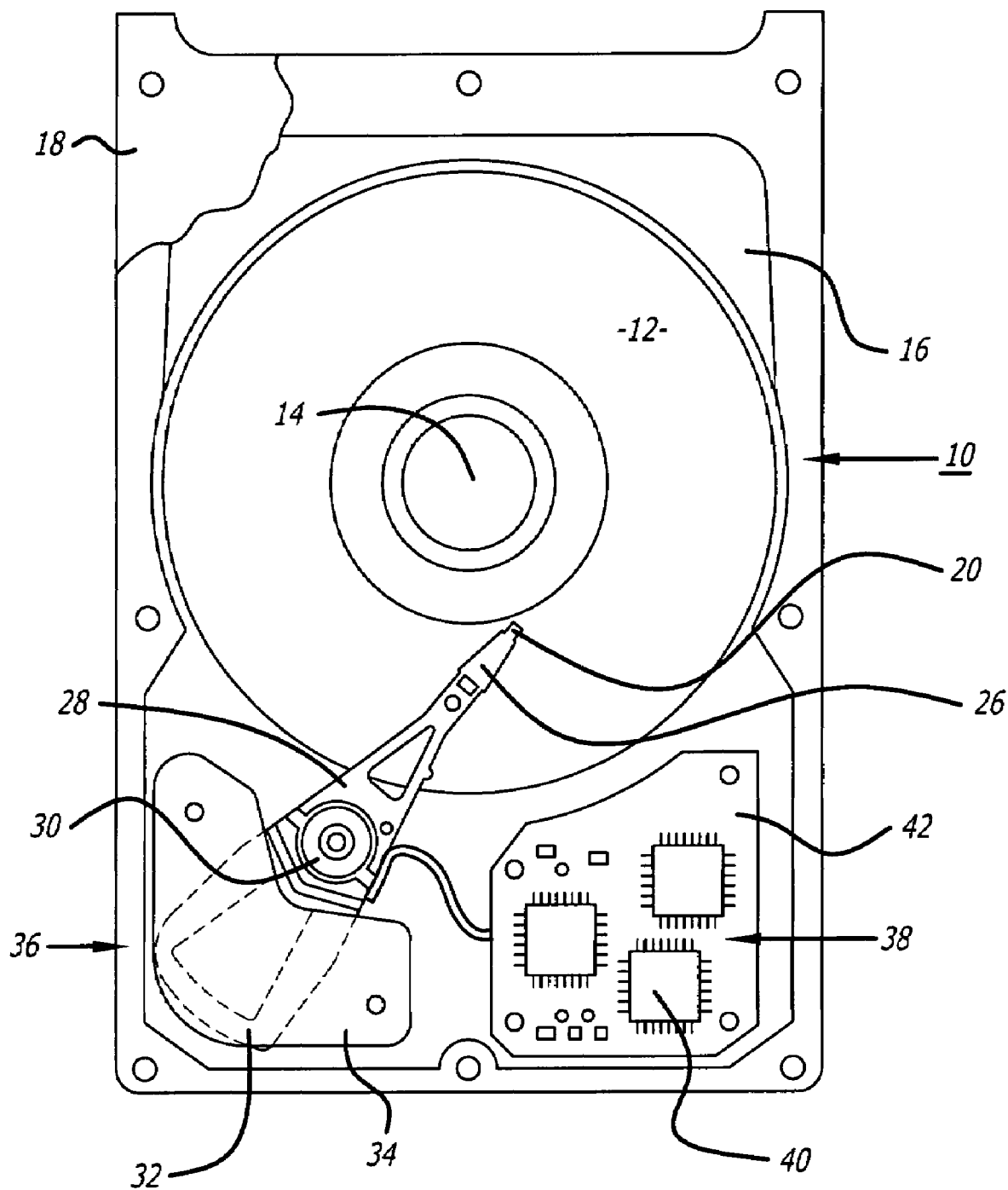
FIG. 3 is a top view of a hard disk drive.

Referring to the drawings more particularly by reference numbers, FIG. 3 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a corresponding flexure arm 22. The flexure arms 22 are attached to an actuator arm 24 that is pivotally mounted to the base plate 16 by a bearing assembly 26. A voice coil 32 is attached to the actuator arm 24. The voice coil 32 is coupled to a magnet assembly 34 to create a voice coil motor (VCM) 36. Providing a current to the voice coil 32 will create a torque that swings the actuator arm 24 and moves the heads 20 across the disks 12. The actuator arm 24 and flexure arms 22 can collectively be referred to as an actuator arm assembly.

Figure 4:
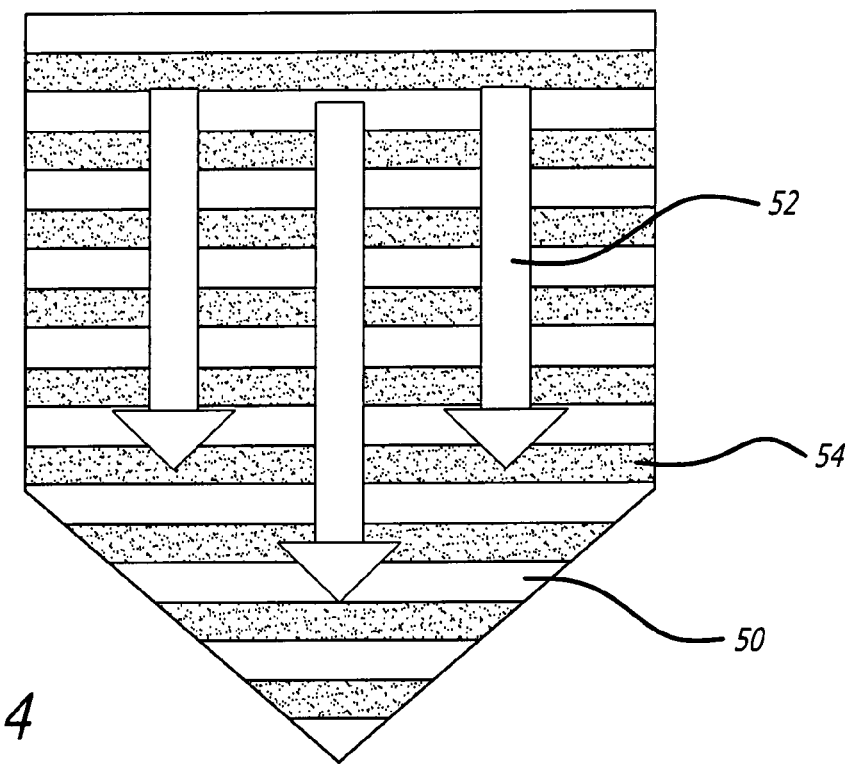
FIG. 4 is an illustration showing magnetic flux flowing relative to a yoke of a head of the drive.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14. The cover 18 and base plate 16 enclose the disk 12 and heads 20 of the disk drive 10. The printed circuit board assembly 38 may include a controller that controls the operation of the disk drive FIG. 4 shows a yoke 50 of a head. During operation of the disk drive, the head receives a current that generates a magnetic flux 52. The flux flows in a vertical direction relative to the yoke 50 through the disk and back to a second pole (not shown) of the head.

Figure 5:
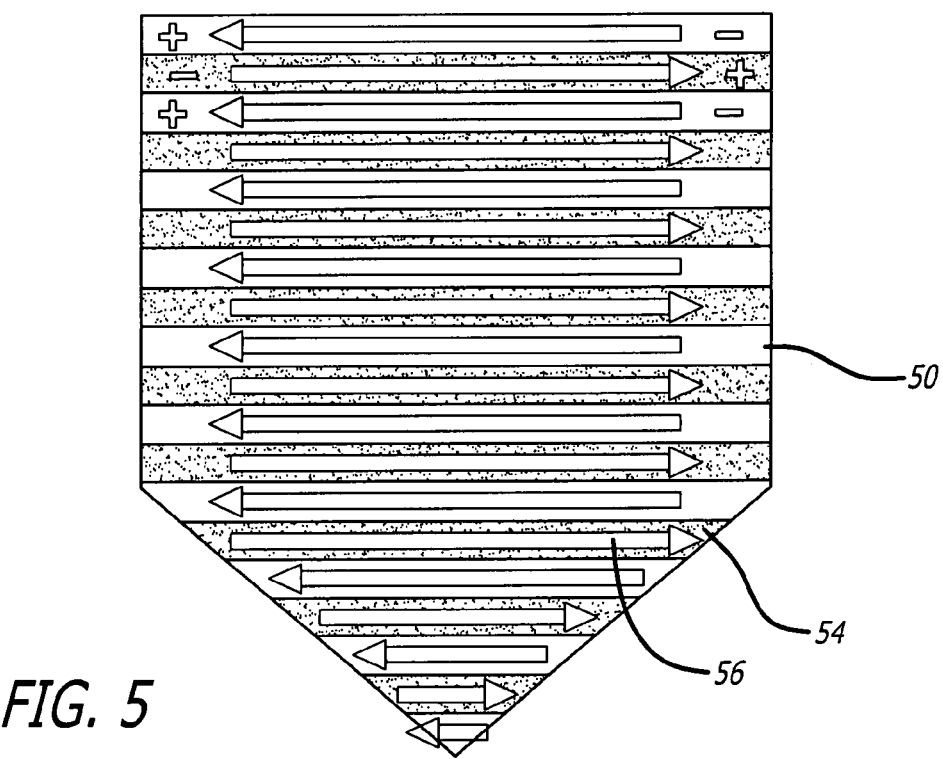
FIG. 5 is an illustration showing residual magnetism within the yoke.

The yoke 50 has a plurality of grooves 54, spaced across the entire surface of the yoke 50, which are essentially perpendicular to the vertical direction of the magnetic flux 52. As shown in FIG. 5, the residual magnetism 56 of the yoke 50 is in the direction of the grooves 54. The residual magnetism has no vertical component that can create domain instability.

The inclusion of grooves in the yoke design allows the head to be formed with any type of conventional manufacturing processes. By way of example, the yoke 50 can be constructed by first applying a yoke material to the head. The yoke may be formed in a plating process or a sputtering process. The yoke material may be $Al_2O_3$. CMP may be utilized to define the height of the pole. A photolithographic pattern of the grooves is formed on the yoke. A removal process may be employed to create a groove in the pole, if such a groove is desired. The yoke may be exposed to an etchant or some other process to create the grooves defined by the photolithographic pattern.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A head for a hard disk drive, comprising:
    a perpendicular recording head that generates a magnetic flux that flows in a vertical direction, and has a yoke with a plurality of grooves that each have a centerline essentially perpendicular to the magnetic flux, said grooves, spaced across the entire surface of the yoke, have a residual magnetism in a direction of said groove centerlines, each groove including a pair of sidewalls that are perpendicular to a bottom surface.

2. The head of claim 1, wherein said yoke includes a plated material.

3. The head of claim 1, wherein said yoke includes a sputtered material.

4. A hard disk drive, comprising:
   a base plate;
   a spindle motor coupled to said base plate;
   a disk coupled to said spindle motor;
   an actuator arm coupled to said base plate;
   a voice coil motor coupled to said actuator arm;
   a perpendicular recording head structurally coupled to said actuator arm and magnetically coupled to said disk, said perpendicular recording head generates a magnetic flux that flows in a vertical direction, and has a yoke with a plurality of grooves that each have a centerline essentially perpendicular to the magnetic flux, said grooves, spaced across the entire surface of the yoke, have a residual magnetism in a direction of said groove centerlines, each groove including a pair of sidewalls that are perpendicular to a bottom surface.

5. The disk drive of claim 4, wherein said yoke includes a plated material.

6. The disk drive of claim 4, wherein said yoke includes a sputtered material.

7. A process for forming a perpendicular recording head for hard disk drive, comprising:
   forming a yoke in a perpendicular recording head; and,
   forming a plurality of grooves in the yoke, each groove having a centerline that is essentially perpendicular to a magnetic flux that flows in a vertical direction from the perpendicular recording head, said grooves, spaced across the entire surface of the yoke, have a residual magnetism in a direction of said groove centerlines, each groove including a pair of sidewalls that are perpendicular to a bottom surface.

8. The process of claim 7, wherein the yoke is formed with a plating process.

9. The process of claim 7, wherein the yoke is formed with a sputtering process.

* * * * *